March 20, 1962 G. PHYLIP-JONES 3,026,422

TRANSISTOR SHIFT REGISTER WITH BLOCKING OSCILLATOR STAGES

Filed Oct. 21, 1957 2 Sheets-Sheet 1

INVENTOR
GWILYM PHYLIP-JONES
BY Fisch..., Fisch... & Ottinger
ATTORNEYS

INVENTOR
GWILYM PHYLIP-JONES
BY Kirschstein, Kirschstein & Ottinger
ATTORNEYS

United States Patent Office 3,026,422

Patented Mar. 20, 1962

3,026,422

TRANSISTOR SHIFT REGISTER WITH BLOCKING OSCILLATOR STAGES

Gwilym Phylip-Jones, Harrow, England, assignor to The General Electric Company Limited, London, England Filed Oct. 21, 1957, Ser. No. 691,457
Claims priority, application Great Britain Oct. 22, 1956
7 Claims. (Cl. 307—88.5)

This invention relates to apparatus which is responsive to electric pulses.

One object of the present invention is to provide an improved construction of such apparatus.

More particularly, but not exclusively, the apparatus is concerned with shift registers for storing information of binary form. This information may, for example, be a binary number but alternatively it may merely be a collection of binary digits in a particular order. Such a register comprises a plurality of stages each of which is arranged to sore one bit (that is to say one digit of the binary information) and which is arranged so that upon the application of a shift pulse the bit stored by each stage (other than possibly an end stage) is transferred to an adjacent stage. Each of these stages is required, at least upon the occurrence of a shift pulse, to provide a signal having one or two values which is utilised to condition the next adjacent stage.

It has previously been proposed to utilise two transistors connected in a bi-stable circuit for each stage of a shift register for storing binary information and it is another object of the present invention to provide such a stage in which only one transistor is required.

According to the present invention, apparatus which is responsive to electric pulses comprises a transistor having base, emitter and collector electrodes, a transformer having first and second windings which are connected in a circuit between the emitter and base electrodes of the ransistor and in circuit with the collector electrode respectively, the arrangement being such that, during operation, the application of a positive-going input pulse to the said emitter electrode or a negative-going input pulse to the base electrode results in an increase in the collector current while positive feedback is applied to the transistor by way of the first and second windings of the transformer so that, for a time, the collector current continues to increase and thereafter the collector current falls and the transistor is cut off, and means which is arranged to absorb at least part of the energy stored in the first winding when the transistor is cut off in this manner and to supply an electric signal in dependence upon the energy so absorbed.

Preferably the said transistor is a junction transistor. The said circuit may comprise storage capacity in combination with a rectifier element, the rectifier element being arranged to permit current to flow and thereby transfer the energy from the said first winding to the capacity when the transistor is cut off as aforesaid but thereafter to be non-conducting.

According to a feature of the present invention, a digit storage stage for a shift register comprises a transistor having base, emitter and collector electrodes, a transformer having first, second and third windings of which the first and second windings are connected in a circuit between the emitter and base electrodes of the transistor and in circuit with the collector electrode of the transistor respectively, the arrangement being such that, during operation, the application of a positive-going input pulse to the said emitter electrode over an input path results in an increase in the collector current while positive feedback is applied to the transistor by way of the first and second windings of the transformer so that, for a time, the collector current continues to increase and thereafter the collector current falls and the transistor is cut off, a rectifier element, storage capacity which is connected in circuit with the said rectifier element and the third winding of the transformer in such a manner that, upon the transistor being cut off as aforesaid, the rectifier element is caused to conduct and at least part of the energy then stored in the first winding of the transformer is transferred to the storage capacity, and means operable upon the occurrence of a shift pulse to apply to an output path a voltage the value of which is dependent upon the voltage across the said capacity.

Preferably the said transistor is a junction transistor. A shift register may comprise a plurality of such stages which are each in accordance with the present invention and which are connected in cascade, the input path of each of these stages except the first being the output path of the preceding stage.

Two examples of apparatus in accordance with the present invention will now be described with reference to the three figures of the accompanying drawings in which.

Figure 1:
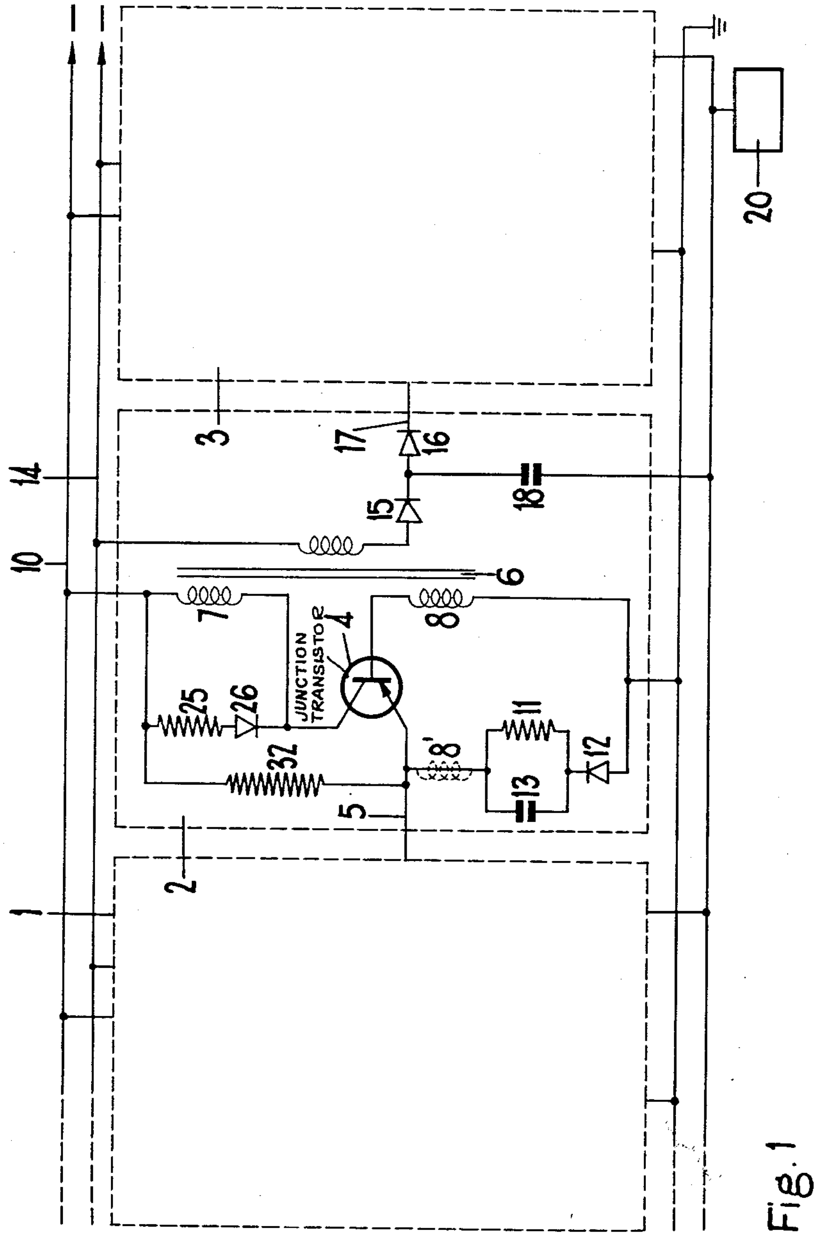
FIGURE 1 shows diagrammatically the circuit of the first example which is a shift register for storing binary information.

Referring now to FIGURE 1 of the drawings, the shift register comprises a plurality of stages connected in cascade of which only the three stages 1, 2 and 3 are shown. All the stages are identical but the detailed circuitry of only the stage 2 is shown in FIGURE 1 and this stage will be considered.

The digit storage stage 2 comprises a junction transistor 4 having an input path 5 connected to its emitter electrode. A transformer 6 having three windings 7, 8 and 9 is associated with the transistor 4, the winding 7, which acts as a primary winding, being connected between the collector electrode of the transistor and a supply line 10 which is maintained at a negative voltage with respect to earth, and the winding 8, which acts as a secondary winding, being connected between the base electrode of the transistor 4 and earth. A resistor 11 is connected in series with a rectifier element 12, which may be a germanium diode, between the emitter electrode and earth, the rectifier element 12 being poled so as to present a low resistance to the base-emitter circuit of the transistor when the transistor is conducting but a high resistance upon the application of a positive-going voltage pulse to the input path 5. A capacitor 13 may also, as shown in FIGURE 1, be connected across the resistor 11.

One terminal of the third transformer winding 9, which also acts as a secondary winding, is connected to another supply line 14 which is maintained at a negative voltage with respect to earth while two rectifier elements 15 and 16, which may for example be germanium diodes, are connected in series between the other terminal of the third transformer winding 9 and an output path 17. These two rectifier elements 15 and 16 are poled so as both to present low resistance to the flow of current towards the output path 17 and one side of a capacitor 18 is connected to the junction of the two rectifier elements 15 and 16. The other side of this capacitor 18 is connected to a path 19 over which regularly recurring shift pulses are supplied from a pulse generator 20.

As will be seen from the drawing, the input and output paths 5 and 17 of the stage 2 are, in fact, the output path of the preceding stage 1 and the input path of the succeeding stage 3 respectively, all these stages being supplied with shift pulses simultaneously from the generator 20.

Figure 2:
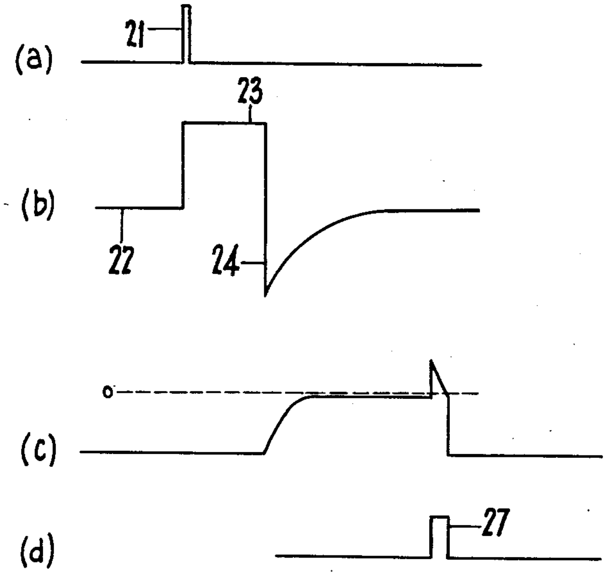
FIGURE 2 shows a number of waveforms that are used to explain the operation of the shift register of FIGURE 1.

Considering now the manner in which the stage 2 operates and referring also to FIGURE 2, let it be assumed that a positive pulse 21 (FIGURE 2(*a*)) of short duration is supplied over the input path 5 at a time when the transistor 4 is cut off. This causes the transistor 4 to conduct and increase the current flow through the winding 7 of the transformer 6. The transformer windings 7 and 8 are connected in such a sense that this increase in current through the winding 7 provides, via the winding 8, positive feedback across the transistor 4 with the result that the transistor "bottoms" by regenerative action. The collector current, however, continues to rise until it reaches the value $\alpha' I_b$ where $\alpha'$ is the static current gain of the transistor 4 with a grounded emitter and $I_b$ is the base current which is substantially constant during this time. The collector voltage of the transistor 4 is shown in FIGURE 2(*b*) and initially this voltage has a value 22, which is the voltage of the supply line 10, while during the rise in the collector current, the collector voltage has the value 23.

The rate of increase of collector current then falls and hence also the voltage across the winding 7 falls so that the voltage fed back across the winding 8 decreases. The base currrent is then reduced and the rate of change of collector current is reduced still further. This action is cumulative with the result that the rate of change of collector current rapidly becomes zero and finally negative so that the voltages developed across the transformer windings 7 to 9 are reversed and the transistor 4 is cut off.

The winding 9 of the transformer 6 is connected in such a sense relative to the winding 7 that when the collector voltage is above the voltage 22 of the supply line 10, the rectifier element 15 connected to the winding 9 does not conduct and the voltage across the capacitor 18 is unchanged. When, however, the voltage across the winding 7 reverses, as described above, and the collector voltage is then below the supply voltage 22, as indicated by the portion 24 of the collector voltage waveform, the voltage developed across the winding 9 causes the rectifier element 15 to conduct and thereby charge the capacitor 18. The voltage at the junction of the two rectifier elements 15 and 16 therefore increases and at the same time the current through the winding 7 decreases to zero and subsequently the collector voltage returns to its original value. It will be appreciated that the major part of the energy stored in the winding 7 of the transformer 6 when the transistor is cut off is transferred in this manner to the capacitor 18.

During this transfer of energy, the voltage at the junction of the rectifier elements 15 and 16 rises to very nearly earth potential as shown by the waveform of FIGURE 2(*c*). The rectifier element 15 becomes non-conducting when the transfer is finished and accordingly the capacitor 18 is not then discharged through the winding 9. At this time the rectifier element 16 is also non-conducting.

Some transient voltages are subsequently developed across the transformer windings 7, 8 and 9 due to the stray capacitance associated with the collector electrode of the transistor 4 being discharged through the winding 7 of the transformer 6.

The energy of the transient voltages is absorbed by a resistor 25 which is connected in series with a rectifier element 26 across the winding 7 of the transformer 6. When these transient voltages have died away the voltages on the transistor electrodes are the same as they were before the occurrence of the input pulse.

Upon the occurrence of a positive-going shift pulse 27 (see FIGURE 2(*d*)) which is supplied by the generator 20, there is a temporary increase in the voltage at the junction of the two rectifier elements to a positive value with respect to earth. This causes the rectifier element 16 to conduct and supply a positive-going pulse to the output path 17. The flow of current from the capacitor 18 in this manner upon the occurrence of the shift pulse 17 discharges the capacitor so that when the shift pulse ceases, the voltage at the junction of the two rectifier elements is reduced to its original value and both the rectifier elements 15 and 16 are non-conducting.

It is to be understood that the waveforms shown in FIGURE 2 are somewhat diagrammatic and are merely for the purpose of explaining the operation of the stage 2 of the shift register. In fact each input pulse does not have a rectangular waveform as shown in FIGURE 2(*a*) since it is constituted by an output pulse of the preceding stage 1.

The arrangement is such that if the transistor 4 of the stage 2, for example, has not passed through the cycle just described, by the time the next shift pulse occurs, no charge has been fed into the capacitor 18 since it was discharged by the previous shift pulse, so that the voltage at the junction of the two rectifier elements 15 and 16 is unchanged and not then sufficient to cause the rectifier element 16 to be conducting upon the occurrence of the shift pulse. Accordingly no pulse is then passed to the next stage 3.

Considering now the shift register as a whole, it will be realised that the binary information stored by each stage, such as the stage 2, is transferred to the next following stage upon the occurrence of each shift pulse supplied by the generator 20. Transients that are generated by each stage and which might result in faulty operation of the register are damped out, for example by the resistor 25 in combination with the rectifier element 26 in the stage 2.

A resistor 32 is connected between the supply line 10 and the emitter electrode of the transistor 4, for example, so as to improve the stability of the stage 2 and to prevent it being falsely triggered during operation.

In one construction of the register stage described above in which the shift pulses recur at a frequency of approximately 500 kilocycles per second, the transformer 6 comprises a ferrite core on which the three windings 7, 8 and 9 are wound, the windings 7 and 9 each having ten turns and the winding 8 having four turns.

The shift register stage 2, for example, may be modified by connecting the input path 5 to the junction of the resistor 11 and the rectifier element 12 instead of directly to the emitter electrode of the transistor 4. Alternatively the transformer winding 8 may be connected between the emitter electrode and the resistor 11 as shown in FIGURE 1 by the broken outline 8', the input path 5 still being connected directly to the emitter electrode and the base electrode then being conected to earth. In this latter case, the recifier element 12 may be omitted provided the winding 8 introduces sufficient impedance between the input path 5 and earth to input pulses on the path 5.

In order to limit the collector electrode current of the transistor, such as the transistor 4, of each register stage, a resistor (not shown) may be connected in series with the winding 7. This has the effect of reducing the width of each positive-going pulse developed at the collector electrode and thereby enabling the register to operate at a higher speed.

Each individual stage of the shift register may be arranged to suply an output signal which is a measure of the binary information stored by that stage. Thus, in respect of the stage 2 for example, the voltage on either the emitter or the collector electrode may be utilised as an output signal of that stage although it will, of course, be appreciated that the output signal is then of pulse form. Alternatively the voltage developed at the junction of the two rectifier elements 15 and 16 may be utilised as an output signal.

Output signals supplied by the several shift register stages may be fed to circuits for performing logical operations in dependence upon the binary information passed thereto at any time. In this case it is convenient for the output signal of the stage 2, for example, to be obtained through two additional rectifier elements which are connected in series between the collector electrode of the transistor 4 and the input lead of the appropriate logic circuit, so as both to permit the flow of current away from the transistor, an additional capacitor being connected between the junction of these two additional rectifier elements and the pulse generator 20. The arrangement is such that when the transistor 4 is caused to conduct, upon a pulse being supplied over the input path 5 as aforesaid, the said additional capacitor is charged while the transistor is conducting. Upon the transistor 4 being cut off again, both the said additional rectifier elements are non-conducting until such time as a positive going pulse is supplied by the generator 20 whereupon an output pulse is passed to the logic circuit and the additional capacitor is discharged.

Figure 3:
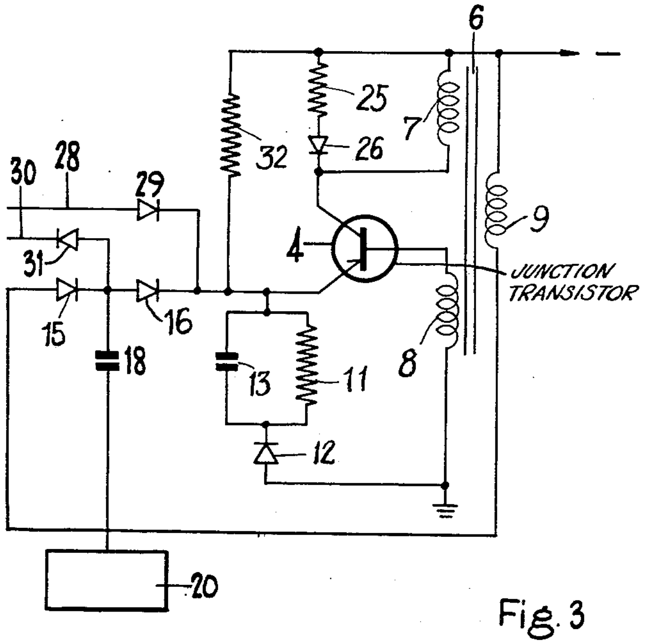
FIGURE 3 shows the circuit diagram of the second example of apparatus in accordance with the invention.

A circuit such as that of the shift register stage 2 described above need not form part of a shift register but may be used otherwise as a binary store. It will be appreciated that it is then necessary to utilise the voltage developed across the capacitor 18 fairly rapidly since the charge on the capacitor is liable to leak away. The circuit may however be made regenerative as shown in FIGURE 3 of the accompanying drawings and, for ease of reference, like parts in FIGURES 1 and 3 have the same reference numerals. In this case the input and output paths corresponding to the paths 5 and 17 in FIGURE 1 are connected together. A train of regularly recurrent pulses is again supplied by the generator 20.

With this arrangement, the transistor 4 is caused to conduct by the application of a positive-going pulse to an input lead 28, this pulse being passed to the emitter electrode of the transistor by way of a rectifier element 29. The transistor 4 and the transformer 6 then pass through the cycle of operation previously discussed with the result that a voltage is developed across the storage capacitor 18. Upon the occurrence of the next pulse supplied by the generator 20, a positive-going pulse is again passed to the emitter electrode of the transistor with the result that the cycle is repeated and the capacitor 18 recharged. This sequence is continued until a negative-going pulse is applied to a lead 30 which causes the capacitor 18 to discharge through a rectifier element 31 thereby preventing the transistor 4 becoming conducting upon the occurrence of the next pulse supplied by the generator 20.

The circuit shown in FIGURE 3 may be modified so that the transistor 4 is initially rendered conducting by means of a negative-going pulse applied to the base electrode instead of by a positive-going pulse applied to the emitter electrode.

I claim:

1. In a shift register which comprises a plurality of cascade-connected digit storage stages which are arranged so that the information stored by each stage is transferred to the following stage upon the application of a shift pulse to the register, one of said digit stages comprising a transistor having base, emitter and collector electrodes, a transformer having first, second and third windings, means to connect the first transformer winding in circuit with the collector electrode of the transistor, means to connect the second transformer winding in a circuit between the emitter and base electrodes of the transistor so that an increase of the amplitude of the collector current results in a cumulative increase of the current due to positive feedback applied to the transistor by way of the first and second windings of the transformer, this increase lasting for a time and thereafter the collector current falling and the transistor being cut-off, a path connecting the preceding stage of the shift register to the emitter electrode of the said transistor so that upon the occurrence of a shift pulse either a pulse or no such pulse is selectively passed over the path to the emitter electrode in dependence upon the information stored at that time by the preceding stage, a rectifier element, storage capacity, means to connect the rectifier element and the storage capacity in circuit with the third winding of the transformer so that, upon the transistor being cut-off as aforesaid, the rectifier element is caused to conduct and at least part of the energy then stored in the first winding of the transformer is transferred to the storage capacity, an output path, and means operable upon the occurrence of a shift pulse to apply to the output path a voltage the value of which is dependent upon the voltage across the said capacity.

2. Apparatus according to claim 1 in combination with means periodically and rapidly to discharge the said storage capacity.

3. A digit storage stage according to claim 1 wherein the second winding of the transformer is connected in the base electrode circuit of the transistor.

4. A digit storage stage according to claim 1 wherein the second winding of the transformer is connected in the emitter electrode circuit of the transistor.

5. A digit storage stage according to claim 1 wherein the said transistor is a junction transistor.

6. A digit storage stage according to claim 1 wherein the last-mentioned means comprises a rectifier element which is connected between the storage capacity and the output path and which is arranged to conduct upon the occurrence of a shift pulse which is applied to that side of the storage capacity remote from this rectifier element provided that there has been a transfer of energy to the storage capacity as aforesaid since the last preceding shift pulse, the consequential flow of current to the output path serving to discharge the storage capacity.

7. A digit storage stage according to claim 1 wherein the said storage capacity is a capacitor.

References Cited in the file of this patent

UNITED STATES PATENTS

| | | |
|---|---|---|
| 2,591,406 | Carter | Apr. 1, 1952 |
| 2,652,501 | Wilson | Sept. 15, 1953 |
| 2,772,370 | Bruce | Nov. 27, 1956 |
| 2,780,767 | Janssen | Feb. 5, 1957 |
| 2,785,304 | Bruce et al. | Mar. 12, 1957 |
| 2,819,840 | Huntley et al. | Jan. 14, 1958 |
| 2,876,438 | Jones | Mar. 3, 1959 |
| 2,902,609 | Ostroff | Sept. 1, 1959 |

FOREIGN PATENTS

| | | |
|---|---|---|
| 1,018,849 | France | Dec. 1, 1954 |
| 1,112,716 | France | Nov. 23, 1955 |